(12) United States Patent
Chae

(10) Patent No.: US 12,322,539 B2
(45) Date of Patent: Jun. 3, 2025

(54) POWER COIL AND MAGNETIC FIELD DIFFERENCE ENGINE

(71) Applicant: Il Hee Chae, Seoul (KR)

(72) Inventor: Il Hee Chae, Seoul (KR)

( * ) Notice: Subject to any disclaimer, the term of this patent is extended or adjusted under 35 U.S.C. 154(b) by 0 days.

(21) Appl. No.: 18/728,506

(22) PCT Filed: Jan. 5, 2023

(86) PCT No.: PCT/KR2023/000246
§ 371 (c)(1),
(2) Date: Jul. 12, 2024

(87) PCT Pub. No.: WO2023/136551
PCT Pub. Date: Jul. 20, 2023

(65) Prior Publication Data
US 2025/0006422 A1   Jan. 2, 2025

(30) Foreign Application Priority Data

Jan. 13, 2022  (KR) .......................... 20-2022-0000103

(51) Int. Cl.
*H01F 27/36* (2006.01)
*H01F 27/30* (2006.01)
(Continued)

(52) U.S. Cl.
CPC .......... *H01F 27/306* (2013.01); *H01F 27/36* (2013.01); *H02K 33/12* (2013.01); *H02K 33/16* (2013.01)

(58) Field of Classification Search
CPC ........ H02K 33/12; H02K 33/16; H02K 53/00; H02K 57/00; H01F 27/306; H01F 27/36
See application file for complete search history.

(56) References Cited

U.S. PATENT DOCUMENTS 6,246,561 B1 * 6/2001 Flynn .................. H02K 33/12
361/147

FOREIGN PATENT DOCUMENTS

KR        20020001830 A     1/2002
KR        100934407 B1     12/2009
(Continued)

*Primary Examiner* — Tulsidas C Patel
*Assistant Examiner* — Robert E Mates
(74) *Attorney, Agent, or Firm* — SZDC Law PC

(57) ABSTRACT

A power coil for a magnetic field difference engine, provided according to the present utility model, comprises a second power shaft (15), a first power shaft (17), and a coil (14), wherein the second power shaft (15) and the first power shaft (17) are horizontally spaced apart from each other to be parallel to each other, and the coil (14) is wound along the longitudinal direction of the second power shaft (15) and the first power shaft (17) and connected at both ends to each other to form a circulating closed circuit. In addition, the magnetic field difference engine provided according to the present utility model comprises: a power coil (100) including the second power shaft (15), the first power shaft (17), and the coil (14); a pair of permanent magnets (11, 12) located above and below the power coil (100) with their N and S poles located to face each other so as to provide a uniform magnetic field to the coil (14); and a current supply unit (18) for supplying current to the coil (14), wherein the power coil (100) includes the second power shaft (15) and the first power shaft (17) that are spaced apart from each other to be parallel to each other, and the coil (14) is wound along the longitudinal direction of the second power shaft (15) and the first power shaft (17) and connected at both ends to each other to form a circulating closed circuit.

5 Claims, 7 Drawing Sheets

(51) Int. Cl.
 *H02K 33/12* (2006.01)
 *H02K 33/16* (2006.01)

(56) References Cited

FOREIGN PATENT DOCUMENTS

| | | |
|---|---|---|
| KR | 20100064483 A | 6/2010 |
| KR | 20110120692 A | 11/2011 |
| KR | 101553911 B1 | 9/2015 |
| KR | 200495762 Y1 | 8/2022 |

\* cited by examiner (a)

(b)

(a)

(b)

(c)

(d)

POWER COIL AND MAGNETIC FIELD DIFFERENCE ENGINE

This application is the National Stage Application of PCT/KR2023/000246, filed on Jan. 5, 2023, which claims priority to Republic of Korea Patent Application No. KR 20-2022-0000103, filed on Jan. 13, 2022, which is incorporated by reference for all purposes as if fully set forth herein.

TECHNICAL FIELD

The present invention relates to a power coil and a magnetic field difference engine including the power coil, and more specifically, to a power coil and a magnetic field difference engine including the power coil, which has a predetermined circulating closed circuit structure configured to perform a linear motion or a reciprocating motion when current is supplied, thereby being applicable to devices requiring rapid and precise motion, such as various automatic opening/closing devices, injectors, magnetic levitation trains, and the likes.

BACKGROUND ART

In general, the law, known as Flemings left-hand law or Lorentz's force in electromagnetism, as illustrated in FIG. 1, indicates that a force acts in a direction perpendicular to both the direction of magnetic field and the direction of current if current flows perpendicular to the direction of a uniform magnetic field, and is the basic principle of power devices using electricity, such as motors.

Up to recently, researches on power devices that provide durable, rapid, and precise motions are continuing. For example, a power supply device, which includes a magnetic field formation part that forms a rotating magnetic field, a power transmission part that rotates by the rotating magnetic field provided by the magnetic field formation part, and an output part to which a rotated body and which rotates the rotated body through the magnetic force provided by the power transmission part, has been developed to be applicable to clothing treatment devices or transport devices. However, the power supply device is complex in structure and is difficult to obtain the desired level of rapid and precise motions.

In addition, researches to use discarded energy such as solar heat, wind power, and magnetic fields as power sources is actively progressing, but no clear results have been shown yet.

Therefore, there is an urgent need for the development of a power device that is simple in structure and durable, and can provide rapid and precise motions.

PATENT LITERATURE

Patent Documents

Korean Patent No. 10-1814939 (granted on Dec. 27, 2017)
Korean Patent No. 10-2171447 (granted on Oct. 23, 2020)

DISCLOSURE

Technical Problem

Accordingly, the present invention has been made in view of the above-mentioned problems occurring in the related art, and it is an objective of the present invention to provide a power coil and a magnetic field difference engine including the power coil, which are simple in structure, durable, and applicable to devices requiring rapid and precise motion, such as various automatic opening/closing devices, injectors, magnetic levitation trains, and the likes.

Technical Solution

To accomplish the above-mentioned objects, according to the present invention, there is provided a power coil for a magnetic field difference engine including: a second power shaft 15, a first power shaft 17, and a coil 14, wherein the second power shaft 15 and the first power shaft 17 are spaced apart parallel to each other horizontally, and the coil 14 is wound in the longitudinal direction of the second power shaft 15 and the first power shaft 17, and connected at both ends to form a circulating closed circuit.

The distance between the second power shaft 15 and the first power shaft 17 is preferably from 5 to 500 cm, more preferably, from 5 to 250 cm, even more preferably, from 5 to 150 cm, and most preferably, from 5 to 50 cm, and, in a specific embodiment being from 5 to 25 cm.

Furthermore, the magnetic field difference engine provided according to one aspect of the present invention includes: a pair of permanent magnets 11 and 12 which provides a uniform magnetic field; a coil 14 which allows current to flow at least partially perpendicular to the direction of the uniform magnetic field provided by the pair of permanent magnets; a second power shaft 15 which is physically connected to the coil, and arranged to reciprocate in a direction perpendicular to both the direction of the uniform magnetic field and the at least partial direction of the current flowing through the coil; a first power shaft 17 which is physically connected to the second power shaft by the coil, and connected to reciprocate simultaneously with the second power shaft; a magnetic shielding part 16 which is positioned within a movement range of the second power shaft; and a current supply unit 18 for supplying current to the coil.

The magnetic shielding part 16 preferably includes a shielding cylinder of a ferromagnetic material, and the shielding cylinder is preferably formed by combining an upper member and a lower member. Here, the magnetic shielding cylinder covers the first power shaft 17 and the coil supported or wound on the first power shaft, and is spaced apart at a proper distance by being supported by an extending coil.

The radius of the magnetic shielding cylinder is preferably not more than half the distance from the first power shaft 17 to the second power shaft 15.

As a preferred embodiment, the upper member, the lower member, or the combination thereof includes one or more wire penetration hole through which wires 21 and 22 connecting the coil and the power device 10 pass, more preferably includes one or two wire penetration holes.

As a preferred embodiment, the upper member, the lower member, or the combination thereof includes two or more coil penetration holes to which the coil can extend and coupled by passing through the magnetic shielding part 16.

The upper member and the lower member preferably each include at least one protruding support protruding at both ends corresponding to each other, more preferably at least two, even more preferably three or more, and most preferably include at least one on each of the front surface and the rear surface of the magnetic shielding part 16. Here, the front surface of the magnetic shielding part refers to a portion where the coil extends outward, that is, in the direction toward the second power shaft, and the rear surface refers to the backside of the magnetic shielding part.

The support part, preferably, includes a fastening hole capable of fixing the magnetic shielding part 16 using a fastening member. Here, the fastening member is not specifically limited as long as it can combine the two parts, and may, for example, be a bolt-nut assembly. In this instance, the magnetic shielding part can be freely opened and closed.

As another example, the support part can also be fixed by welding or adhesive without fixing holes.

The ferromagnetic material preferably includes iron.

The fixing jaw preferably includes an insertion hole which allows insertion of a probe of a magnetometer.

The magnetic field difference between the outside and inside of the magnetic shielding part 16 is preferably from 1 to 50 mT, more preferably from 3 to 20 mT, and even more preferably from 4 to 10 mT. The magnetic field is not specifically limited if it is measured using a magnetic field measurement method or a magnetometer including a probe commonly used in the technical field to which the present invention pertains.

Moreover, according to one aspect of the present invention, there is provided a magnetic field difference engine 10 utilizing magnetic force including: a power coil 100 including a second power shaft 15, a first power shaft 17, and a coil 14; a pair of permanent magnets 11 and 12 positioned above and below the power coil 100 and providing a uniform magnetic field to the coil 14; a magnetic shielding part 16 located within a movement range of the first power shaft 17; and a current supply unit 18 for supplying current to the coil 14, wherein the power coil 100 is arranged such that the second power shaft 15 and the first power shaft 17 are spaced apart parallel to each other horizontally, and the coil 14 is wound in the longitudinal direction of the second power shaft 15 and the first power shaft 17, and connected at both ends to form a circulating closed circuit.

Furthermore, according to one aspect of the present invention, there is provided a magnetic field difference engine 10 utilizing magnetic force including: a power coil 100 including a second power shaft 15, a first power shaft 17, and a coil 14; a pair of permanent magnets 11 and 12 positioned above and below the power coil 100 such that the S-pole and the N-pole face each other to provide a uniform magnetic field to the coil 14; and a current supply unit 18 for supplying current to the coil 14, wherein the power coil 100 is arranged such that the second power shaft 15 and the first power shaft 17 are spaced apart parallel to each other horizontally, and the coil 14 is wound in the longitudinal direction of the second power shaft 15 and the first power shaft 17, and connected at both ends to form a circulating closed circuit.

Additionally, according to another aspect of the present invention, there is provided a magnetic field difference engine 10 utilizing magnetic force including: a power coil 100 including a second power shaft 15, a first power shaft 17, and a coil 14; an electromagnetic wave generator 24 positioned one time to five times the distance between the second power shaft 15 and the first power shaft 17 from the power coil 100, and emitting electromagnetic waves with a wavelength (A) of 0.1 to 10 m; and a current supply unit 18 for supplying current to the coil 14, wherein the power coil 100 is arranged such that the second power shaft 15 and the first power shaft 17 are spaced apart parallel to each other horizontally, and the coil 14 is wound in the longitudinal direction of the second power shaft 15 and the first power shaft 17, and connected at both ends to form a circulating closed circuit.

The electromagnetic wave generator 24 is preferably located at a distance of one time to three times, more preferably one to two times, and most preferably approximately 1.5 times the distance between the second power shaft and the first power shaft from the power coil 100.

The electromagnetic wave generator 24 preferably emits electromagnetic waves with a wavelength (A) of 0.1 to 5 m, more preferably 0.1 to 3 m, and most preferably 0.1 to 1 m, in a specific embodiment being 0.1 to 0.5 m.

The electromagnetic wave generator 24 is preferably connected and fix to the power coil 100 via a connection frame 26, and in this case, the distance between the electromagnetic wave generator and the power coil and the wavelength of the electromagnetic waves are fixed, enabling rapid and precise movement.

The electromagnetic wave generator is not specifically limited if it is the electromagnetic wave generator typically used in the technical field of the present invention as long as it follows the definition provided in the present invention.

The current supply unit 18 is preferably configured to provide a current of which the direction is switched at a predetermined time interval.

The second power shaft 15 and/or the first power shaft 17 are made of a diamagnetic material, more preferably may include copper or aluminum. Here, the second power shaft 15 is not necessarily required unlike the first power shaft 17, but can provide beneficial effects.

The coil 14 is preferably rectangular, circular, or elliptical in shape, more preferably square or circular.

As a preferred embodiment, the coupled portion of the coil 14 and the second power shaft 15 and/or the first power shaft 17 may be fixed by a fixing jaw 20, and/or bearings or wheels 23 may be respectively inserted and installed on right and left sides of the second power shaft 15 and/or the first power shaft 17 not coupled to the coil.

The bearings 23 may be, for example, plain bearings, rolling bearings, ball bearings, or roller bearings, preferably ball bearings or roller bearings, and specifically, may be wheel bearings connected to or included in wheels.

The wheels 23 are not specifically limited as long as they are typically usable in the technical field of the present invention, and as a specific example, may be wheels which can be coupled to the bearings or include the bearings.

The direction of the uniform magnetic field is preferably at least partially perpendicular to the direction of the current flowing in the coil 14. Furthermore, the non-uniform magnetic field formed by the magnetic shielding part 16 in a space between the permanent magnets 11 and 12 is preferably at least partially perpendicular to the direction of the current flowing in the coil 14.

In embodiments provided according to the present invention, the current supply unit 18 provides a current of 10 to 30 A, preferably 15 to 30 A, and more preferably 20 to 25 A. The current amount is not specifically limited if it can be measured using methods or instruments for measuring current typically used in the technical field of the present invention.

In embodiments provided in the present invention, the physical connection between the second power shaft 15 and/or the first power shaft 17 and the coil 14 is not specifically limited if it is a physical method of physically supporting a coil around a shaft in the technical field of the present invention. Preferably, the connection is achieved by binding the coil 14 to the second power shaft 15 and/or the first power shaft 17 using binding means such as metal wire or adhesive tape, or more preferably, by directly winding and fixing the coil 14 onto the second power shaft 15 and/or the first power shaft 17. More preferably, the coil 14 is directly wound and fixed on the second power shaft 15 and/or the first power shaft 17 such that the force applied to the coil is well transferred to the shaft, thereby enhancing the durability of the magnetic field difference engine and enabling rapid and precise motion.

The second power shaft 15 and/or the first power shaft 17 preferably includes bearings or wheels 23 which are inserted and installed outside both sides of the coil 14.

As a preferred embodiment, a seating part 19 is formed between the first power shaft 17 and bearings, and/or between the second power shaft 15 and bearings. In this case, the bearings or wheels 23 are more firmly fixed to the first power shaft and/or the second power shaft.

The seating part 19 preferably includes rubber, such as rubber rings, rubber bands, or rubber tape.

Preferably, the first power shaft 17 and/or the second power shaft 15 includes fixing jaws 20 installed at positions adjacent to both ends of the coil 14 to fix the coil.

Advantageous Effect

The power coil and the magnetic field difference engine including the power coil, which has the predetermined circulating closed circuit structure configured to perform a linear motion or a reciprocating motion when current is supplied, are simple in structure, durable, and applicable to devices requiring rapid and precise motion, such as various automatic opening/closing devices, injectors, magnetic levitation trains, and the likes. For example, the power coil and the magnetic field difference engine including the power coil can be applicable to automatic opening/closing devices in a semiconductor process requiring stringent environment creation, injectors producing precision molded products, or magnetic levitation trains requiring precise control.

MODE FOR INVENTION

Hereinafter, the present invention will be described in detail with reference to the accompanying drawings.

<Power Coil>

Figure 1:
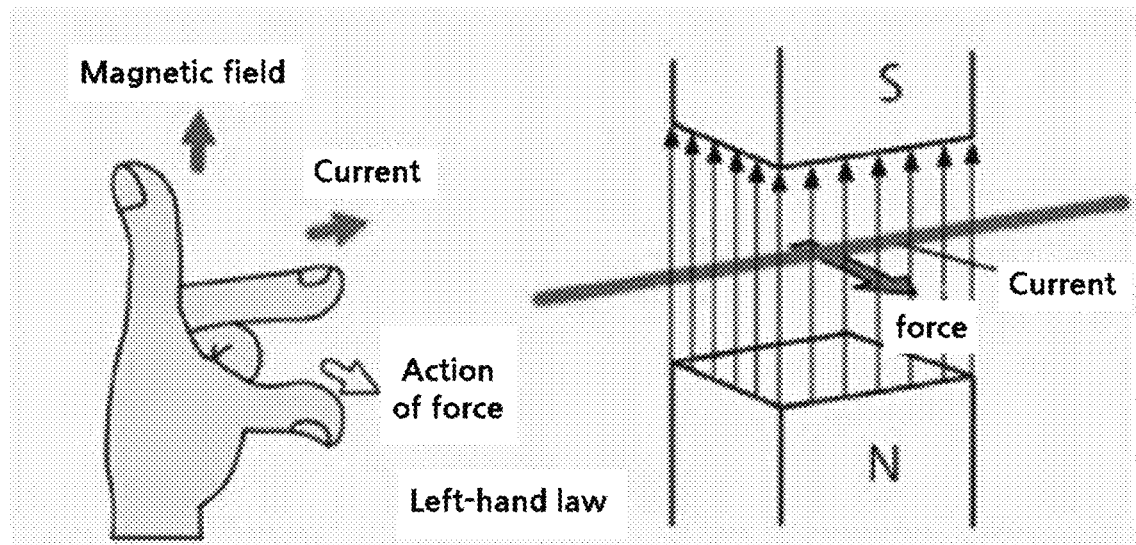
FIG. 1 is a schematic diagram showing Fleming's left-hand law, which determines the direction of the force acting on a conductor when current flows in a general uniform magnetic field.
Figure 2:
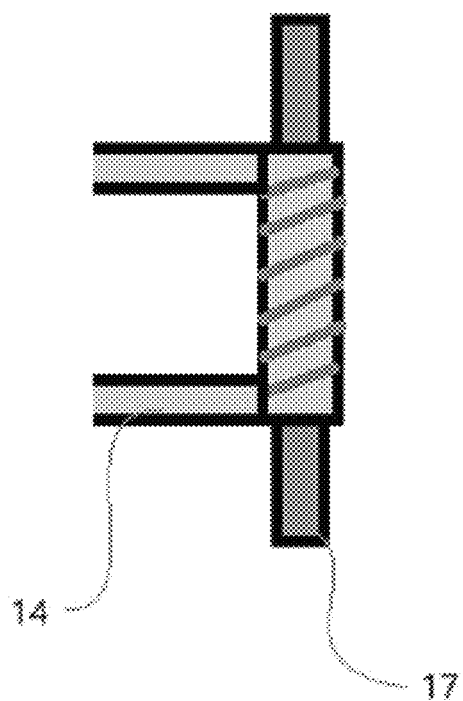
FIG. 2 is a schematic diagram illustrating a structure where a coil 14 is wound around a first power shaft 17 according to the present invention.
Figure 3:
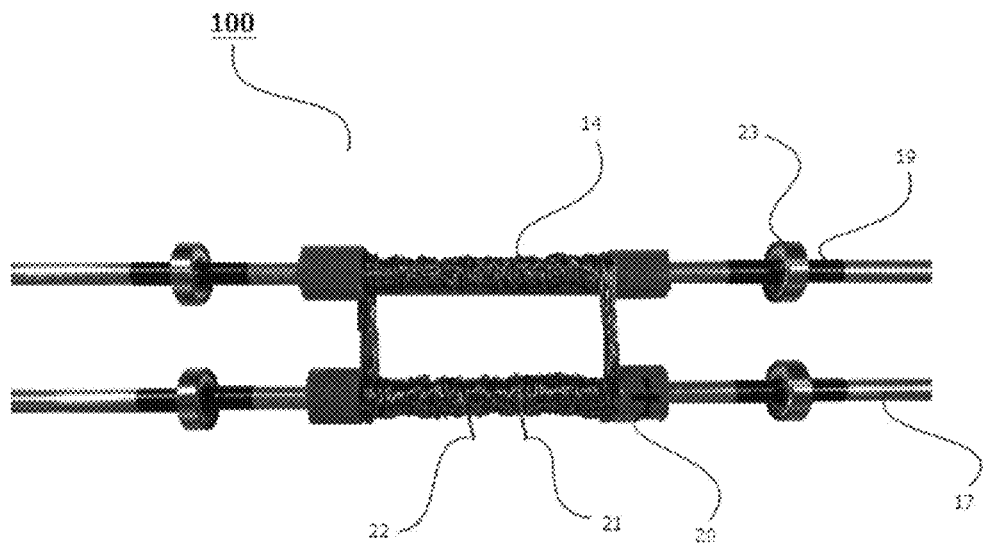
FIG. 3 is a photograph of an embodiment where the coil 14 of a closed-circuit structure according to the present invention is connected to a second power shaft 15 and the first power shaft 17.

FIG. 2 is a schematic diagram illustrating a structure where a coil 14 is wound around a first power shaft 17 according to the present invention, and FIG. 3 is a photograph of an embodiment where the coil 14 of a closed-circuit structure according to the present invention is connected to a second power shaft 15 and the first power shaft 17.

As illustrated in FIG. 2, in one aspect provided by the present invention, the physical connection part between a first power shaft 17 and a coil 14 is where the coil 14 is physically fixed to the first power shaft 17 by being directly wound on the first power shaft 17, and the two coil extension parts extending from the physical connection part to a second power shaft 15 are a bundle of coil strands. Here, in the drawings, the bundle of coils is illustrated without twists, however, if necessary, the entire or a portion of the coil bundle may be twisted in the longitudinal direction.

In this description, unless otherwise defined, the coil can be interpreted as a coil strand, a bundle of coils, or an assembly of coils, and such interpretations are apparent to those skilled in the art.

As illustrated in FIG. 3, the coil 14 of the closed-circuit structure according to one aspect of the present invention is physically connected to the second power shaft 15 by being directly wound on the second power shaft 15, and a connection part of the coil 14, the second power shaft 15, and the first power shaft 17 is firmly fixed by a fixing jaw 20. Additionally, seating parts 19 into which bearings are inserted are formed on right and left sides of the second power shaft 15 and the first power shaft 17, which are not coupled with the coil 14, and bearings or wheels 23 are installed on top of the seating parts 19. Moreover, the coil 14 extends perpendicularly to the second power shaft 15 and the first power shaft 17, and thereafter, the two extension parts are connected to each other to form a circulating closed circuit. Additionally, wires 21 and 22 supplying current from the current supply unit 18 to the coil 14 are connected at the coupled part of the coil 14 and the first power shaft 17. Here, the second power shaft 15 and the first power shaft 17 are horizontally aligned, and the closed-circuit structure of the coil 14 is laid on the horizontal plane. In this instance, the force applied to the coil and others is evenly distributed to the second power shaft 15, thereby stably and precisely performing movement of the magnetic field difference engine.

<Magnetic Field Difference Engine Including Magnetic Shielding Part>

Figure 4:
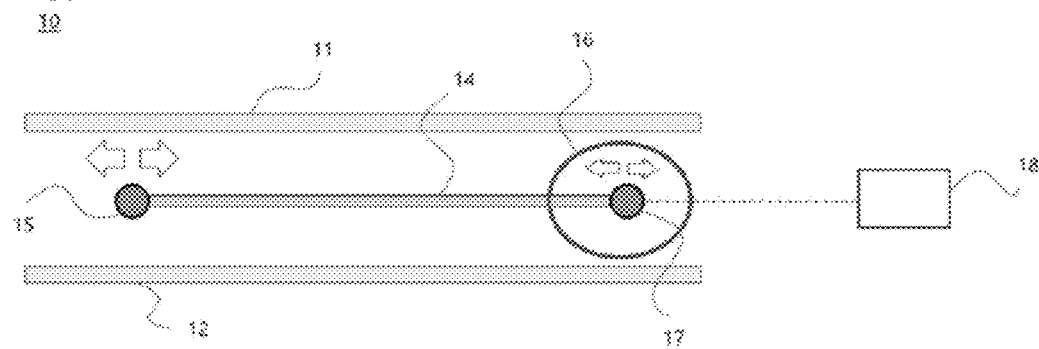
FIG. 4 is a schematic side view illustrating a structure of a magnetic field difference engine including a magnetic shielding part according to the present invention.
Figure 5:
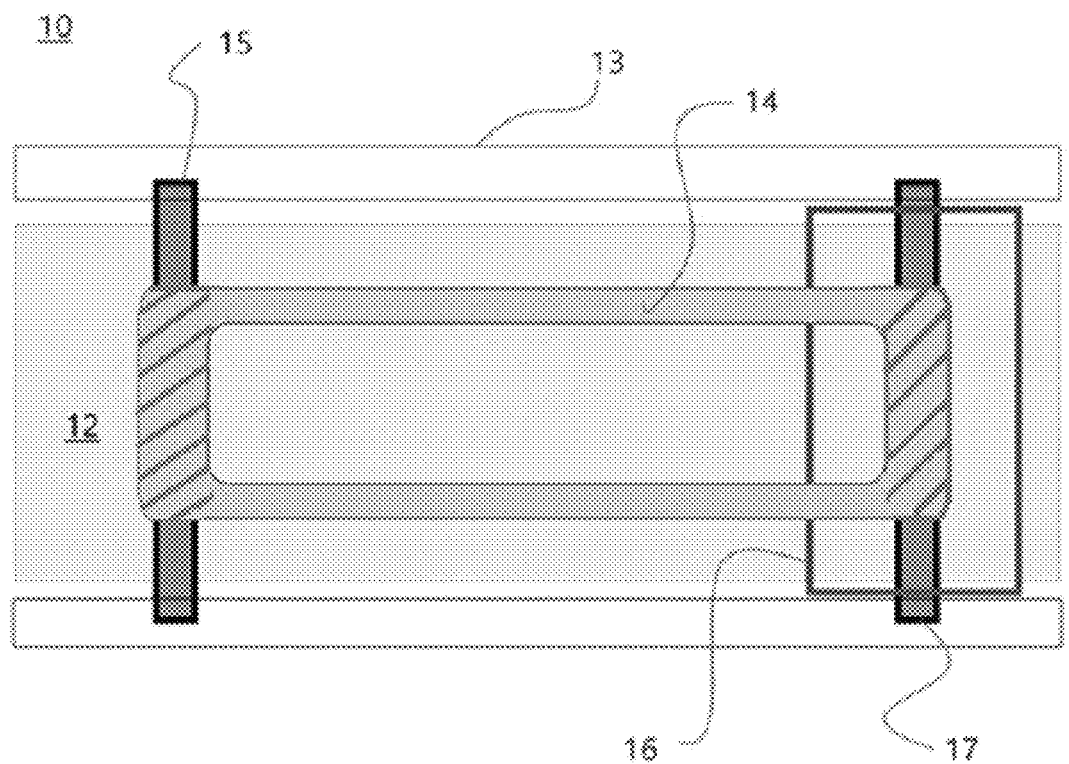
FIG. 5 is a schematic plan view illustrating the structure of the magnetic field difference engine illustrated in FIG. 4.
Figure 6:
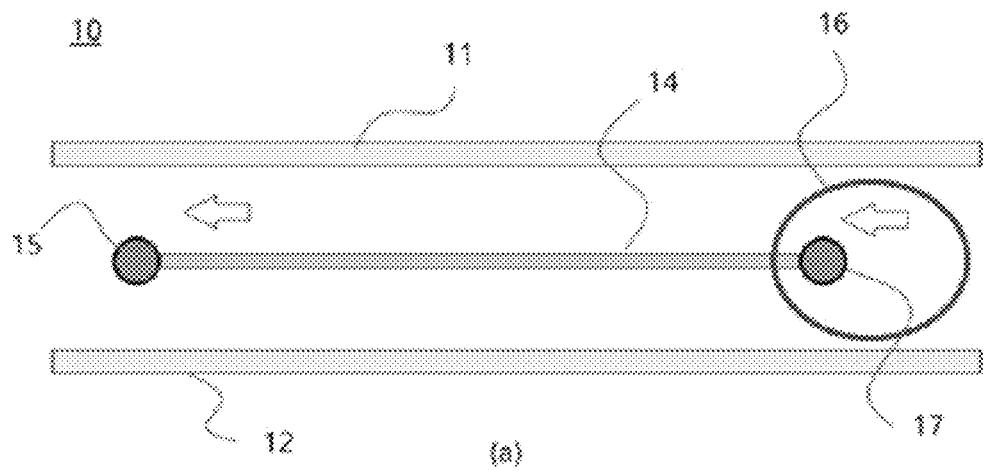
FIGS. 6 (*a*) and 6 (*b*) are schematic side views illustrating a reciprocating motion of the magnetic field difference engine illustrated in FIG. 4.
Figure 6:
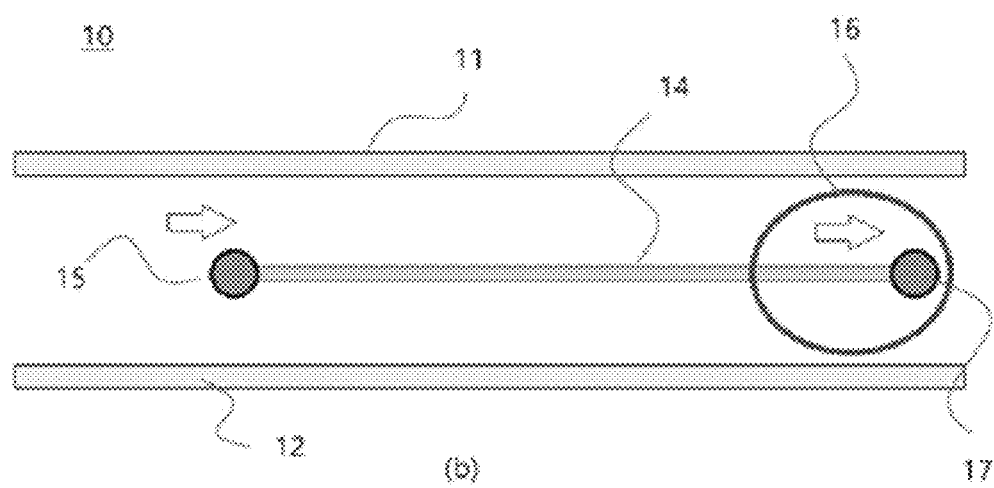

FIG. 4 is a schematic side view illustrating a structure of a magnetic field difference engine including a magnetic shielding part according to the present invention, FIG. 5 is a schematic plan view illustrating the structure of the magnetic field difference engine illustrated in FIG. 4, and FIGS. 6 (*a*) and 6 (*b*) are schematic side views illustrating a reciprocating motion of the magnetic field difference engine illustrated in FIG. 4. Additionally, FIG. 9 shows photographs of a lower member a and an upper member b of the magnetic shielding part, a power coil c combined with the magnetic shielding part, and a power coil d fixing the magnetic shield part with a metal fixing band.

Figure 9:
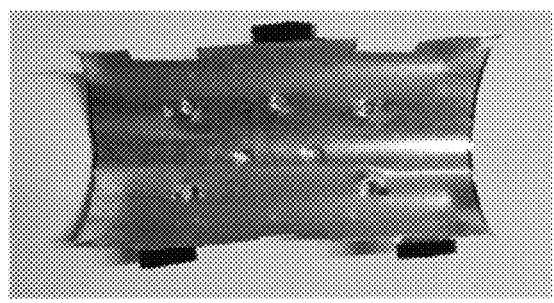
FIG. 9 shows photographs of a lower member a and an upper member b of the magnetic shielding part, a power coil c combined with the magnetic shielding part, and a power coil d fixing the magnetic shield part with a metal fixing band.
Figure 9:
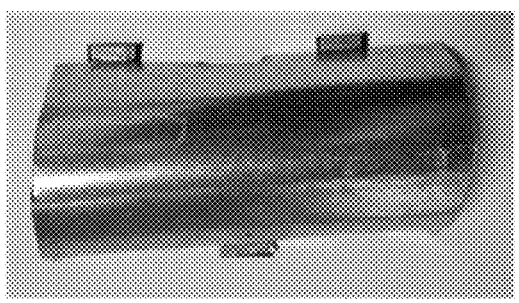
Figure 9:
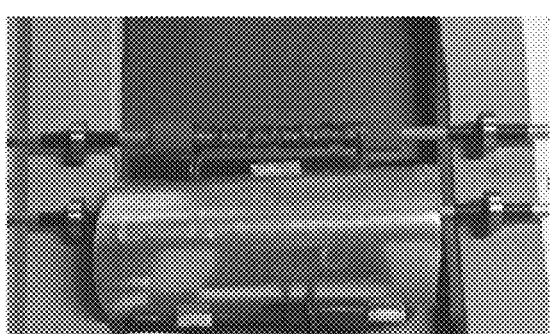
Figure 9:
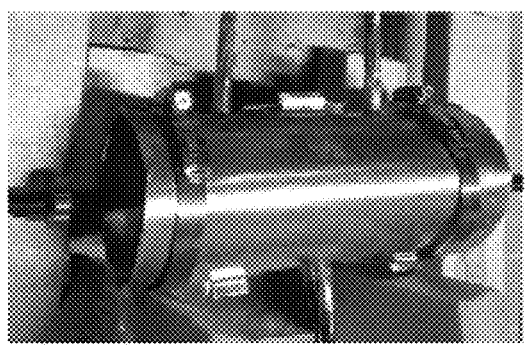

As illustrated in FIGS. 4, 5, and 9, the magnetic field difference engine 10 according to one aspect of the present invention includes permanent magnets 11 and 12, a coil 14, a second power shaft 15, a first power shaft 17, a magnetic shielding part 16, a current supply unit 18, and a frame 13 for fixing and supporting the components.

A pair of permanent magnets 11 and 12 are spaced apart from each other at a predetermined distance, each indicating a South pole and a North pole. For instance, if the first permanent magnet 11 is the South pole, the second permanent magnet 12 is the North pole, and vice versa. A uniform magnetic field is formed in a space between the permanent magnets 11 and 12. Consequentially, the magnetic shielding part 16 serves to form a non-uniform magnetic field in the space between the permanent magnets 11 and 12.

The coil 14 is a means to allow current to flow at least partially perpendicular to the direction of the uniform magnetic field provided by the pair of permanent magnets 11 and 12, and for example, is made of a material like copper wire, which conducts electricity effectively. Furthermore, the coil 14 may be also a means to allow current to flow at least partially perpendicular to the direction of the non-uniform magnetic field formed by the pair of permanent magnets 11 and 12 and the magnetic shielding part 16.

The magnetic shielding part 16 is arranged within a movement range of the first power shaft 17 and shields only around the first power shaft 17 limited by the magnetic shielding part 16 within the uniform magnetic field formed by the permanent magnets 11 and 12. Therefore, the magnetic shielding part 16 is made from a ferromagnetic material such as iron.

The first power shaft 17 is physically connected to the second power shaft 15 through the coil 14, and reciprocates in response to changes in the direction of the current flowing through the partially shielded coil 14. The second power shaft 15 which is physically connected to the first power shaft 17 also reciprocates simultaneously.

Meanwhile, the second power shaft 15 is made from an electrically non-conductive material, and reciprocates due to the force acting on the coil 14 by being physically connected to the coil 14. For this purpose, the second power shaft 15 is oriented perpendicularly to the direction of the uniform magnetic field provided by the permanent magnets 11 and 12, and also oriented perpendicularly to the direction of the at least partial current flowing in the coil 14. As the direction of the current flowing in the coil 14 changes, the force acting on the coil is also changed by 180°, so the second power shaft 15 reciprocates in response to the change in the direction of the current flowing in the coil.

In this description, the metal fixing band is not specifically limited if it is the metal fixing band which is typically used in the technical field of the present invention, but preferably a fixing band made of the same metal material as the magnetic shielding part.

The current supply unit 18 is to supply current to the coil 14, and for example, can provide a direct current in one direction for a predetermined period and then provide a direct current in the opposite direction for another predetermined period. The switching of the direction of the current can be controlled by the user pressing a button. Accordingly, when the user presses a button, the first power shaft 17 can move in the direction illustrated in FIG. 6(a), and then, when the user presses the same or a different button again, the first power shaft 17 can move in the opposite direction as illustrated in FIG. 6(b).

In the embodiments provided according to the present invention, the current supply unit 18 can be configured to provide the current of which the direction is automatically switched at a predetermined time interval. In this case, the first power shaft 17 can be configured to automatically reciprocate at every predetermined time period. In this case, the motions illustrated in FIGS. 6(a) and (b) can occur automatically at regular intervals.

<Magnetic Field Difference Engine Including North and South Poles>

Figure 7:
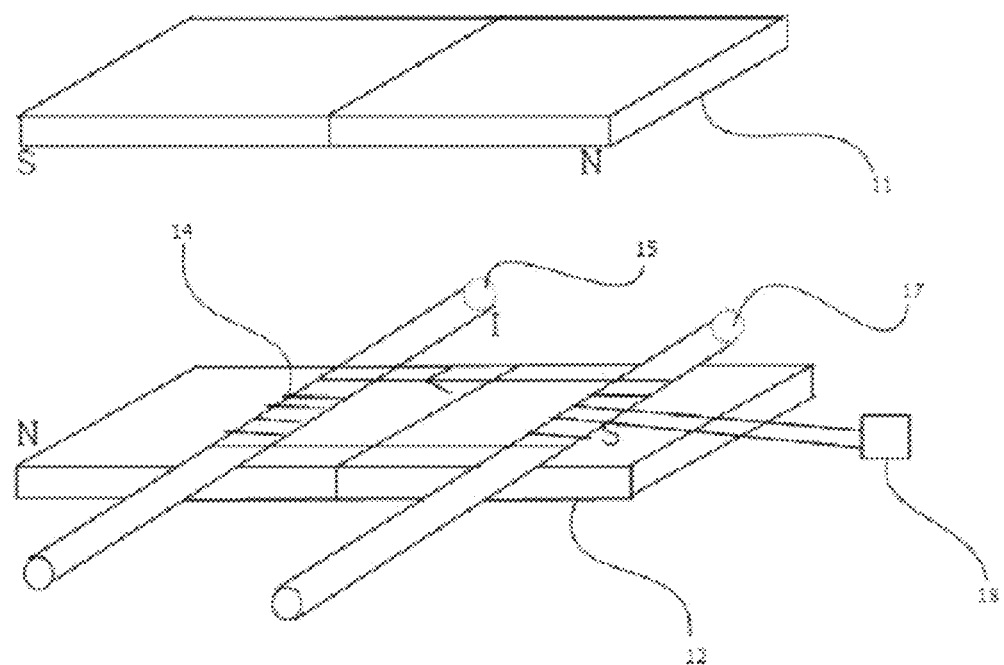
FIG. 7 is a layout diagram roughly illustrating the coil 14 with the circulating closed circuit structure and permanent magnets 11 and 12 arranged above and below the coil such that the S-pole and the N-pole face each other according to the present invention.

FIG. 7 is a layout diagram roughly illustrating the coil 14 with the circulating closed circuit structure and permanent magnets 11 and 12 arranged above and below the coil such that the S-pole and the N-pole face each other according to the present invention.

As illustrated in FIG. 7, the magnetic field difference engine 10 according to one aspect of the present invention includes: a power coil 100 including a second power shaft 15, a first power shaft 17, and a coil 14; a pair of permanent magnets 11 and 12 located above and below the power coil 100 such that the S-pole and the N-pole face each other to provide a uniform magnetic field to the coil 14; and a current supply unit 18 for supplying current to the coil 14, wherein the power coil 100 is arranged such that the second power shaft 15 and the first power shaft 17 are spaced apart from each other to be parallel to each other, and the coil 14 is wound in the longitudinal direction of the second power shaft 15 and the first power shaft 17 and connected at both ends to each other to form a circulating closed or circuit, thereby providing rapid and precise linear reciprocating motions when direct current or alternating current is supplied to the power coil 100 through the current supply unit 18.

Referring to FIG. 7, the North pole of the upper permanent magnet 11 faces the South pole of the lower permanent magnet 12, and the South pole of the upper permanent magnet 11 faces the North pole of the lower permanent magnet 12, thereby forming a non-uniform magnetic field around the power coil 100 between the permanent magnets 11 and 12.

The magnetic field difference engine including the North and South poles can incorporate all the features described in the magnetic field difference engine including the power coil and the magnetic shielding part unless explicitly stated otherwise.

<Magnetic Field Difference Engine Including Electromagnetic Wave Generator>

Figure 8:
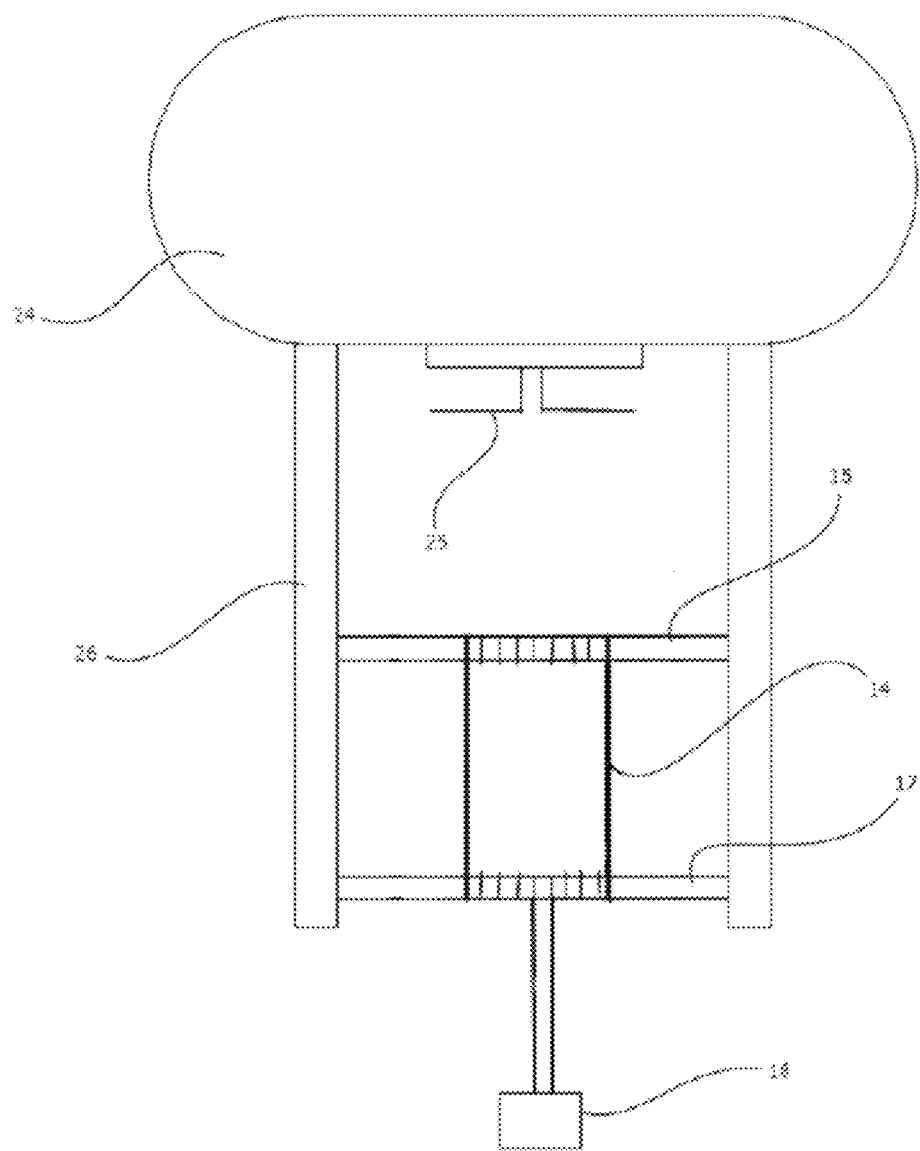
FIG. 8 is a plan view schematically illustrating a magnetic field difference engine 10 including an electromagnetic wave generator 24 according to the present invention.

FIG. 8 is a plan view schematically illustrating a magnetic field difference engine 10 including an electromagnetic wave generator 24 according to the present invention.

As depicted in FIG. 8, the magnetic field difference engine 10 according to one aspect of the present invention includes: a power coil 100 including a second power shaft 15, a first power shaft 17, and a coil 14; an electromagnetic wave generator 24 positioned approximately 1.5 times the distance between the second power shaft 15 and the first power shaft 17 from the power coil 100, and emitting electromagnetic waves with a wavelength (A) of approximately 0.12 m; and a current supply unit 18 for supplying current to the coil 14, wherein the power coil 100 is arranged such that the second power shaft 15 and the first power shaft 17 are spaced apart from each other to be parallel to each other, and the coil 14 is wound in the longitudinal direction of the second power shaft 15 and the first power shaft 17 and connected at both ends to each other to form a circulating closed circuit, thereby providing rapid and precise linear or reciprocating motions when direct or alternating current flows through the coil 14, and electromagnetic waves of the specified wavelength are emitted to the coil 14 through an antenna 25. In this instance, the power coil 100 and the electromagnetic wave generator 24 are connected and fixed by a connection frame 26. In addition, the distance between the second power shaft 15 and the first power shaft 17 means the shortest distance between the second power shaft 15 and the first power shaft 17 based on FIG. 8, and the distance from the power coil 100 to the electromagnetic wave generator 24 means the shortest distance between the power coil 100 and the antenna 25 based on FIG. 8.

The magnetic field difference engine including the electromagnetic wave generator can incorporate all the features described in the magnetic field difference engine including the power coil and the magnetic shielding part and the magnetic field difference engine including the North and South poles unless explicitly stated otherwise.

In conclusion, as described in the embodiments, the magnetic field difference engine of the present invention can supply current to the coil with the predetermined circulating closed-circuit structure which is either partially magnetically shielded in the uniform magnetic field, or creates a specific magnetic field environment, or to which electromagnetic waves are irradiated, thereby providing a simple structure and durability, and being applicable to devices requiring rapid and precise motion, such as various automatic opening/closing devices, injectors, magnetic levitation trains, and the likes. For example, the power coil and the magnetic field difference engine including the power coil can be applicable to automatic opening/closing devices in a semiconductor process requiring stringent environment creation, injectors producing precision molded products, magnetic levitation trains, magnetic levitation vehicles, ropeless elevators, or lifting type or traveling type amusement rides requiring precise control.

While the invention has been described through the depicted embodiments, it should be understood that various changes can be made by those skilled in the art by referring to and combining various features described herein without departing from the scope as defined in the appended claims.

SEQUENCE LIST TEXT

10: magnetic field difference engine, 11, 12: permanent magnet, 14: coil, 15: second power shaft, 16: magnetic shielding part, 17: first power shaft, 18: current supply unit, 19: seating part, 20: fixing jaw, 21, 22: wire, 23: bearing or wheel, 24: electromagnetic wave generator, 25: antenna, 26: connection frame, 100: power coil

The invention claimed is:

1. A magnetic field difference engine 10 utilizing magnetic force, comprising:
   a power coil 100 including a second power shaft 15, a first power shaft 17, and a coil 14;
   a pair of permanent magnets 11 and 12 positioned above and below the power coil 100 and providing a uniform magnetic field to the coil 14;
   a magnetic shielding part 16 located within a movement range of the first power shaft 17; and
   a current supply unit 18 for supplying a current to the coil 14,
   wherein the power coil 100 is arranged such that the second power shaft 15 and the first power shaft 17 are spaced apart parallel to each other horizontally, and the coil 14 is wound in a longitudinal direction on the second power shaft 15 and on the first power shaft 17, and connected at two ends to form a circulating closed circuit, and
   wherein the second power shaft 15 is made of a diamagnetic material or a non-conductive material, and the first power shaft 17 is made of a diamagnetic material.

2. The magnetic field difference engine according to claim 1, wherein the current supply unit 18 is configured to provide a current of which the direction is switched at a predetermined time interval.

3. The magnetic field difference engine according to claim 1, wherein a connection part of the coil 14 and the second power shaft 15, and a connection part of the coil 14 and the first power shaft 17 are fixed by a fixing jaw 20, and wherein bearings or wheels 23 are inserted and installed on right and left sides of the second power shaft 15 and the first power shaft 17, which are not coupled with the coil 14.

4. A magnetic field difference engine 10 utilizing magnetic force, comprising:
   a power coil 100 including a second power shaft 15, a first power shaft 17, and a coil 14;
   a pair of permanent magnets 11 and 12 positioned above and below the power coil 100 such that an S-pole and an N-pole face each other to provide a uniform magnetic field to the coil 14; and
   a current supply unit 18 for supplying a current to the coil 14,
   wherein the power coil 100 is arranged such that the second power shaft 15 and the first power shaft 17 are spaced apart parallel to each other horizontally, and the coil 14 is wound in a longitudinal direction on the second power shaft 15 and on the first power shaft 17, and connected at two ends to form a circulating closed circuit, and
   wherein the second power shaft 15 is made of a diamagnetic material or a non-conductive material, and the first power shaft 17 is made of a diamagnetic material.

5. A magnetic field difference engine 10 utilizing magnetic force, comprising:
   a power coil 100 including a second power shaft 15, a first power shaft 17, and a coil 14;
   an electromagnetic wave generator 24 positioned one time to five times a distance between the second power shaft 15 and the first power shaft 17 from the power coil 100, and emitting electromagnetic waves with a wavelength ($\lambda$) of 0.1 to 10 m; and
   a current supply unit 18 for supplying current to the coil 14,
   wherein the power coil 100 is arranged such that the second power shaft 15 and the first power shaft 17 are spaced apart parallel to each other horizontally, and the coil 14 is wound in a longitudinal direction on the second power shaft 15 and on the first power shaft 17, and connected at two ends to form a circulating closed circuit, and
   wherein the second power shaft 15 is made of a diamagnetic material or a non-conductive material, and the first power shaft 17 is made of a diamagnetic material.

* * * * *